(12) United States Patent
Gauthier

(10) Patent No.: US 11,516,166 B1
(45) Date of Patent: *Nov. 29, 2022

(54) HEADER RECOGNITION TECHNIQUES FOR AN EMAIL THREADING TOOL

(71) Applicant: RELATIVITY ODA LLC, Chicago, IL (US)

(72) Inventor: Brandon Gauthier, Centreville, VA (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,968

(22) Filed: Jan. 25, 2021

Related U.S. Application Data

(63) Continuation of application No. 15/612,676, filed on Jun. 2, 2017, now Pat. No. 10,904,190.

(51) Int. Cl.
| | |
|---|---|
| *H04L 51/216* | (2022.01) |
| *H04L 69/22* | (2022.01) |
| *G06Q 10/10* | (2012.01) |
| *H04L 51/48* | (2022.01) |
| *G06Q 50/18* | (2012.01) |

(52) U.S. Cl.
CPC .......... *H04L 51/216* (2022.05); *G06Q 10/10* (2013.01); *G06Q 10/107* (2013.01); *G06Q 50/18* (2013.01); *H04L 51/48* (2022.05); *H04L 69/22* (2013.01)

(58) Field of Classification Search
None
See application file for complete search history.

(56) References Cited

U.S. PATENT DOCUMENTS

| | | | |
|---|---|---|---|
| 7,421,690 B2 * | 9/2008 | Forstall | H04L 51/00 718/100 |
| 7,730,113 B1 * | 6/2010 | Payette | G06Q 10/00 707/821 |

(Continued)

OTHER PUBLICATIONS

RFC #822 Standard for the Formal of ARPA Internet Text Messages, David H. Crocker rev. Aug. 13, 1982.

*Primary Examiner* — Lance Leonard Barry
(74) *Attorney, Agent, or Firm* — Marshall, Gerstein & Borun LLP; Randall G. Rueth

(57) ABSTRACT

In a computer-implemented method for facilitating recognition of header fields in electronic communication documents, header definition data and an electronic communication document are received. The header definition data defines one or more characteristics of a first header format, wherein the one or more characteristics include one or both of (i) keywords or partial keywords, and (ii) positions, corresponding to one or more header fields. Text-based content of the electronic communication document includes conversation segments, which include one or more headers. Using the header definition data, values of header fields of at least one of the plurality of conversation segments are determined. Using the determined values, an ordered relationship between the electronic communication document and one or more other electronic communication documents is determined. Metadata indicating the ordered relationship between the electronic communication documents is stored to facilitate user review of the electronic communication documents via an electronic document review tool.

20 Claims, 8 Drawing Sheets

(56) References Cited

U.S. PATENT DOCUMENTS

| | | | | |
|---|---|---|---|---|
| 9,710,539 | B2* | 7/2017 | Dey | G06Q 10/107 |
| 10,044,662 | B1* | 8/2018 | Mesters | H04L 51/22 |
| 10,740,534 | B1* | 8/2020 | Andrusenko | G06F 16/383 |
| 2004/0015609 | A1* | 1/2004 | Brown | H04L 43/0817 |
| | | | | 709/246 |
| 2004/0111466 | A1* | 6/2004 | Beringer | H04L 69/22 |
| | | | | 709/203 |
| 2005/0138210 | A1* | 6/2005 | Shkvarchuk | H04L 69/08 |
| | | | | 709/246 |
| 2009/0327401 | A1* | 12/2009 | Gage | H04L 67/20 |
| | | | | 709/203 |
| 2012/0054135 | A1* | 3/2012 | Salaka | G06Q 10/107 |
| | | | | 706/13 |
| 2012/0191771 | A1* | 7/2012 | Preston | G08B 25/006 |
| | | | | 709/201 |
| 2013/0024448 | A1* | 1/2013 | Herbrich | G06F 16/951 |
| | | | | 707/728 |
| 2013/0124548 | A1* | 5/2013 | Chhaparia | G06F 16/245 |
| | | | | 707/758 |
| 2014/0280254 | A1* | 9/2014 | Feichtner | G06K 9/6253 |
| | | | | 707/755 |
| 2017/0111297 | A1* | 4/2017 | Arisada | H04L 51/16 |

* cited by examiner

```
                                                                    ┌─250
    ┌─────────────────────────────────────────────────────────────────┐
    │                                                                 │
    │                                                                 │
    │    ┌ From:    Paul Ahrens                        ┐               │
    │    │ Sent:    Thursday, October 24, 2016 1:30 PM │               │
    │    │ To:   Mike McGinn <mmcginn@enron.com>       ├ 254A          │
    │    │ CC:   John Acorn <jacorn@enron.com>         │               │
    │ 252A│ Subject:  RE: FW: Feedback requested       ┘               │
    │    ┤                                                             │
    │    │ Cool, thanks Mike! ├ 256A                                   │
    │    │                                                             │
    │    │ Paul Ahrens            ┐                                    │
    │    └ Sent from my Blackberry ├ 258A                              │
    │                                                                 │
    │    ┌ From:    Mike McGinn                        ┐               │
    │    │ Sent:    Thursday, October 24, 2016 1:12 PM │               │
    │    │ To:   Paul Ahrens <pahrens@enron.com>       ├ 254B          │
    │    │ CC:   John Acorn <jacorn@enron.com>         │               │
    │    │ Subject:  FW: RE: Feedback requested        ┘               │
    │ 252B┤                                                        ┐   │
    │    │ Paul,                                                   │   │
    │    │ Here's what Elgar had to say.  Still waiting on an exact number, but ├ 256B
    │    │ this should at least be ballpark.                       ┘   │
    │    │                                                             │
    │    │ Thanks,         ┐                                           │
    │    │ Mike McGinn     ├ 258B                                      │
    │    └ mmcginn@enron.com ┘                                         │
    │                                                               ┐  │
    │     On Oct 21, 2016, at 12:15 AM, Elgar Holtz <eholtz@enron.com> wrote: ├ 254C
    │                                                               ┘  │
    │         Hey Mike                                             ┐   │
    │                                                              │   │
    │ 252C┤    I'd say 20, 25 at most.  I'll look further into it.  Should be in ├ 256C
    │         the office there late next week.                     ┘   │
    │                                                                 │
    │         Elgar   ├ 258C                                           │
    │                                                                 │
    │    ┌ From:    Mike McGinn                        ┐               │
    │    │ Sent:       Thursday, October 17, 2016 1:12 AM │            │
    │    │ To:   Elgar Holtz <eholtz@enron.com>        ├ 254D          │
    │    │ Subject:   Feedback requested               ┘               │
    │ 252D┤                                                         ┐  │
    │    │ Elgar:  I could use those numbers we talked about.  When are you ├ 256D
    │    │ flying in from Sydney?                                    ┘  │
    │    │                                                             │
    │    │ Thanks,         ┐                                           │
    │    │ Mike McGinn     ├ 258D                                      │
    │    └ mmcginn@enron.com ┘                                         │
    │                                                                 │
    └─────────────────────────────────────────────────────────────────┘
```

*FIG. 5*

HEADER RECOGNITION TECHNIQUES FOR AN EMAIL THREADING TOOL

CROSS-REFERENCE TO RELATED APPLICATIONS

This is a continuation of U.S. patent application Ser. No. 15/612,676, entitled "Header Recognition Techniques for an Email Threading Tool" and filed on Jun. 2, 2017 (issued as U.S. Pat. No. 10,904,190 on Jan. 26, 2021), the entirety of which is hereby incorporated herein by reference.

FIELD OF THE DISCLOSURE

The present disclosure generally relates to electronic document review and, more specifically, to techniques for processing electronic communication documents (e.g., emails) prior to user review.

BACKGROUND

In various applications, a need exists to extract meaningful information from a corpus of electronic documents. In the discovery process commonly associated with litigation, for example, attorneys are commonly provided a large corpus of electronic documents, including electronic communication documents (e.g., emails) that were received from, or may be sent to, an opposing party. Given the potentially enormous number of such documents (e.g., in the millions), analyzing each and every electronic communication document can be an extremely time-consuming process. Typically, many of these electronic communication documents convey redundant information. In an email context, for example, the corpus of emails may include a copy of a particular email from the sender's outbox, and another copy from the inbox of each recipient. In such instances, a reviewer does not need to review each copy of the email to determine whether the email is relevant to the discovery process. As another example, an email message may include information from previous emails within an email chain (e.g., as can be seen by scrolling down while viewing the email), with the final email of a chain typically containing all of the information conveyed by prior emails within the same "conversation." In such instances, these prior emails can be safely discarded or ignored without losing any meaningful information.

"Threading" (e.g., "email threading") is a process that reduces the number of documents in a corpus of electronic communication documents by removing electronic communication documents that fail (or very likely fail) to convey new information. An email may convey new information, if, for example, the email includes a new recipient or attachment, the subject and/or the body of the email is not included in any other emails in the same chain or conversation, and/or the email is a final email in the chain or conversation. Electronic document review tools that organize electronic communication documents according to thread can provide great efficiencies in the user review process. For example, a user reviewing documents may be able to quickly identify which emails within a particular corpus of emails share a common thread (or share a common group of related threads that branch off of each other), and focus solely on that set of emails before moving on to the next thread or thread group.

To arrange electronic communication documents into conversation threads, the documents are generally pre-processed (i.e., processed prior to user review of the documents) to generate metadata indicating the ordered relationship among the documents within each thread. In one technique for determining such ordered relationships, the threading process requires identifying a number of different "conversation segments" in each document, where each conversation segment corresponds to a single communication from a single person. In a given email, for example, earlier conversation segments can usually be seen by scrolling down to look at previous messages in the same email chain, with each segment including a header, a message body, and possibly a signature block. The ordered relationships may then be determined by comparing the conversation segments (or segment portions) of one electronic communication document to the conversation segments (or segment portions) of other electronic communication documents, with any matching segments or segment portions generally indicating that two different documents belong to the same thread or the same thread group (i.e., a set of threads all sharing the same root document).

Unfortunately, various issues can make it difficult to accurately reconstruct a thread. Accurate thread reconstruction typically requires accurate identification of conversation segments, segment sections (e.g., headers), and/or segment fields (e.g., header fields such as sender, recipient, and/or date/time). The task of identifying segments, segment sections, and/or segment fields can be complicated by the fact that, at least in certain scenarios, characteristics that might otherwise be reliable indicators of these elements can vary. For example, different software clients (e.g., Microsoft Outlook, Lotus Notes, etc.) may use different names/keywords for the same field (e.g., "From:" versus "Sender:" or "By:" or "Author:"), and/or may place the same field at different positions within a header or other segment section. Moreover, the field keywords and/or positions may vary over time even for a single software client, as new versions of the client come into widespread use. As a result, software developers for threading tools may need to continually play "catch up" as new formats (e.g., new header formats) appear, by writing code that is able to properly parse fields according to each new format. Furthermore, certain field keywords may change even among subsequent conversation segments within a single electronic communication document, depending on the language of the sender and/or recipient at each stage of the conversation.

Typically, if even a single conversation segment or segment portion (e.g., header field) of a particular electronic communication document cannot be identified, the entire document is discarded or ignored for purposes of thread reconstruction. Thus, the above-noted difficulties associated with conventional parsing of electronic communication documents can lead to a significant loss of information for reviewing users.

BRIEF SUMMARY

In one aspect, a computer-implemented method for facilitating recognition of header fields in electronic communication documents includes receiving, at a computing system, header definition data defining one or more characteristics of a first header format, wherein the one or more characteristics include one or both of (i) keywords or partial keywords, and (ii) positions, corresponding to one or more header fields. The method also includes receiving, by one or more processors of the computing system, a first electronic communication document that includes text-based content, the text-based content including a plurality of conversation segments, and the plurality of conversation segments including one or more headers. The method also includes determining, by the one or more processors and using the header definition data, values of the one or more header fields within the one or more headers of at least one of the plurality of conversation segments, and determining, by the one or more processors and using the determined values of the one or more header fields, an ordered relationship between the first electronic communication document and one or more other electronic communication documents. The method also includes storing, by the one or more processors, metadata indicating the ordered relationship between the first electronic communication document and the one or more other electronic communication documents to facilitate user review of at least the first electronic communication document and the one or more other electronic communication documents via an electronic document review tool.

In another aspect, a computing system includes an electronic document database, one or more processors, and one or more memories storing instructions. The instructions, when executed by the one or more processors, cause the computing system to receive header definition data defining one or more characteristics of a first header format, wherein the one or more characteristics include one or both of (i) keywords or partial keywords, and (ii) positions, corresponding to one or more header fields, and retrieve, from the electronic document database, a first electronic communication document that includes text-based content, the text-based content including a plurality of conversation segments, and the plurality of conversation segments including one or more headers. The instructions also cause the computing system to determine, using the header definition data, values of the one or more header fields within the one or more headers of at least one of the plurality of conversation segments, and determine, using the determined values of the one or more header fields, an ordered relationship between the first electronic communication document and one or more other electronic communication documents. The instructions also cause the computing system to store metadata indicating the ordered relationship between the first electronic communication document and the one or more other electronic communication documents to facilitate user review of at least the first electronic communication document and the one or more other electronic communication documents via an electronic document review tool.

In another aspect, a non-transitory, computer-readable medium stores instructions that, when executed by one or more processors, cause the one or more processors to receive header definition data defining one or more characteristics of a first header format, wherein the one or more characteristics include one or both of (i) keywords or partial keywords, and (ii) positions, corresponding to one or more header fields, and receive a first electronic communication document that includes text-based content, the text-based content including a plurality of conversation segments, and the plurality of conversation segments including one or more headers. The instructions also cause the one or more processors to determine, using the header definition data, values of the one or more header fields within the one or more headers of at least one of the plurality of conversation segments, and determine, using the determined values of the one or more header fields, an ordered relationship between the first electronic communication document and one or more other electronic communication documents. The instructions also cause the one or more processors to store metadata indicating the ordered relationship between the first electronic communication document and the one or more other electronic communication documents to facilitate user review of at least the first electronic communication document and the one or more other electronic communication documents via an electronic document review tool.

BRIEF DESCRIPTION OF THE DRAWINGS

FIG. 5 depicts text-based content of an electronic communication document that may be processed by an artificial neural network of the present invention, according to one embodiment and scenario.

DETAILED DESCRIPTION

I. Overview

Figure 1:
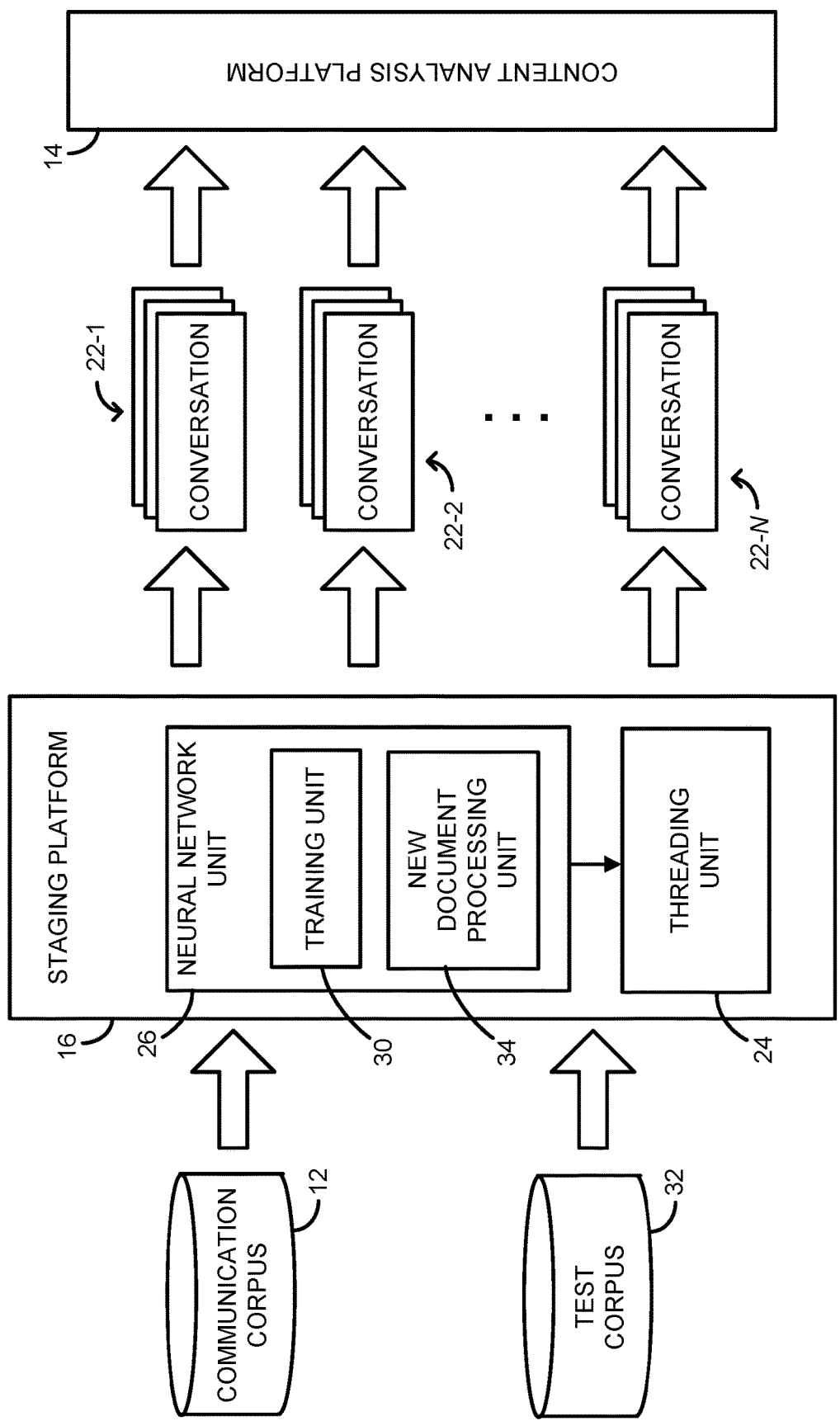
FIG. 1 depicts an example environment in which techniques for accurately reconstructing electronic communication document threads may be implemented, according to one embodiment.

The embodiments described herein relate to, inter alia, the processing of electronic communication documents (e.g., emails) to reconstruct conversation threads. The systems and techniques described herein may be used, for example, in connection with electronic document review tools of the sort commonly used during litigation. However, other applications are also possible. For example, the systems and techniques described herein may be used by a company or other entity to categorize and/or review its own archived electronic communication documents (e.g., emails to and from customers, etc.), and/or for other purposes.

More specifically, the embodiments described herein relate to threading techniques that rely on the identification of conversation segments within a given electronic communication document, and/or the identification of portions of such segments (e.g., headers, and/or specific header fields such as sender, recipient, and/or date, etc.). The term "conversation segment" (or simply "segment"), as used herein, generally refers to the incremental content (e.g., header, message body, and possibly signature block) added at each step of a communication chain/thread, not including any modifications that may have been made to earlier segments of the conversation (e.g., by adding in-line responses to an earlier email in an email chain). Thus, for example, a root/first electronic communication document generally includes only a single conversation segment, a reply thereto generally includes exactly two conversation segments, and so on, with each new reply or forward (or draft thereof) adding an additional segment. In at least some embodiments (e.g., for email documents), each successive document within the chain/thread will typically contain both the most recent conversation segment and every previous segment, such that a reader can reference earlier stages of the conversation by looking further down in the text of the document.

In some embodiments, identification of particular conversation segments and/or segment portions is accomplished using a "machine vision" technique that, in some respects, may mimic the process by which a person consciously or subconsciously identifies segments and/or segment portions within a communication document, even if that person is unfamiliar with the specific formatting of those segments and/or segment portions. For example, the machine vision technique may identify headers by analyzing the spacing between lines, the length of lines, the frequency and placement of certain delimiters (e.g., colons), the presence of two and/or four digit numbers (e.g., indicating time and/or date information), and so on. As another example, the machine vision technique may identify an author or sender field of a header by analyzing whether a first word of a line within an identified header is followed by a colon, whether the colon is followed by two to four words each having only the first letter capitalized (e.g., a person's name), whether the line occurs prior to another, similar type of line (e.g., corresponding to the recipient of the document), and so on.

In some embodiments, despite mimicking (to some extent) the process by which a human user might visually process a document, the machine vision techniques described herein do not require processing any image files (e.g., raster image files such as JPEG, GIF, or PNG, or vector image files). For example, the machine vision techniques described herein may analyze only (or primarily) non-image, text-based data of each electronic communication document, such as alphanumeric characters and associated formatting or control elements (e.g., HTML or ASCII elements representing tabs, line breaks, etc.). Accordingly, the machine vision techniques described herein represent a novel approach that utilizes non-image-based processing to achieve results more akin to those traditionally associated with image processing.

In some embodiments, the machine vision system may make use of an artificial neural network, and train the neural network using a set of electronic communication documents having known characteristics (e.g., known segment and header delineations, header field locations, etc.). The neural network may employ multiple layers of nodes or "neurons," with each neuron determining a particular parameter (e.g., making a particular decision), and with each layer corresponding to a different level of granularity. For example, the neurons of a first layer of the neural network may examine an electronic communication document as a whole to identify conversation segments within the document, the neurons of a second layer may examine those segments (using information from the first layer) to identify segment sections such as headers and/or signature blocks, and the neurons of a third layer may examine those segment sections (using information from the second layer) to identify fields such as sender, recipient, and date/time. In some embodiments, a recurrent neural network is used, with decisions made by neurons of one layer being fed back to the previous layer. In this manner, the recurrent neural network may learn the importance of various parameters (i.e., the importance of particular document characteristics, and/or of particular parameters derived from such characteristics) to the various decisions made by the neurons of the machine vision system, and may weigh the parameters accordingly for future document processing.

In some embodiments, users (e.g., users of an electronic document review tool) may provide information that helps tailor the system to a specific set of electronic communication documents. For example, users may provide their own electronic communication documents, along with indicators of known segment delineations, header locations, and/or other characteristics, as additional training documents for a neural network. This may aid a machine vision system by allowing the system to learn from documents arranged in a format that was previously unknown to the system, and/or by biasing the system towards the types of documents that are more likely to be found in a particular set of documents. Alternatively (e.g., if machine vision is not employed for the pre-processing of documents, or to supplement a machine vision system), a mechanism may be provided whereby users submit header definition data (e.g., rules or regular expressions) that facilitates the parsing of particular header fields for a particular header format (e.g., a format unfamiliar to the computing system that performs threading-related operations). In some embodiments where user information is input to the system, an electronic document review tool provides a user interface that guides the user through a process of selecting various segments, segment portions, and/or segment fields, and automatically generates truth data/labels for training (if used in a machine vision context) or header definition data (if used in a system that parses headers in a more conventional manner) based on the user selections.

By replacing conventional threading techniques with one or more of the techniques described herein, various advantages may be obtained. For example, even if a particular software client (e.g., Microsoft Outlook or Lotus Notes) implements a new version that changes a header (and/or other segment section) format, and even if electronic communication documents generated by a particular software client of software client version are encountered for the first time, there may be no need to develop new code to identify segments (and segment sections, fields, etc.) associated with those software clients and/or versions. As another example, the techniques described herein may enable more accurate identification of particular header fields in instances where the language of header field names/keywords can change from document to document or segment to segment.

The machine vision systems and techniques described herein may provide other advantages as well. For example, the use of a neural network with multiple layers of granularity may allow an email or other electronic communication document to be added to a thread even if the machine vision system fails to identify certain segment sections, or certain fields, etc. This may provide a user with more information about the structure of a conversation, as compared to conventional threading techniques that simply discard or ignore documents that cannot be fully processed under a set of software client-specific (and/or version-specific) parsing rules.

II. Example Environments for Reconstructing and/or Presenting Electronic Communication Document Threads FIG. 1 depicts an example environment 10 in which a corpus of electronic communication documents 12 is staged for analysis via a content analysis platform 14, according to one embodiment. Communication corpus 12 may include a plurality (e.g., thousands, millions, etc.) of electronic communication documents. As used herein, the term "electronic communication document" generally refers to an electronic document that represents an exchange (or a potential/planned exchange, as in the case of a draft email) between two or more individuals. However, the term can also (in some embodiments and/or scenarios) include documents that are addressed from an individual to himself or herself (e.g., an email sent from the individual's personal email account to his or her work email account). While some of the examples described herein refer specifically to email, it should be appreciated that the techniques described herein are applicable to other types of electronic communication documents. For example, some instant messaging applications may archive a conversation upon its conclusion. The electronic file that represents the instant messaging conversation may be considered an "electronic communication document." As another example, social media platforms may support their own form of messaging (e.g., a Facebook message, an Instagram direct message, etc.). Each of these messages may also be considered an "electronic communication document." Furthermore, recent email platforms like Slack blend several types of electronic communications into a single conversation. Electronic files that underlie these types of email platforms may also be considered "electronic communication documents."

Communication corpus 12 may be ingested into a staging platform 16 to organize communication corpus 12 in a manner that facilitates efficient analysis via content analysis platform 14. Communication corpus 12 may be ingested into staging platform 16 by executing a computer program on a computing device that has access to the environment 10. The ingestion process may involve the computer program providing an instruction to staging platform 16 as to a location at which communication corpus 12 is stored, for example. Using this location, staging platform 16 may access communication corpus 12 for performing conversation threading techniques.

Staging platform 16 may analyze communication corpus 12 to arrange the electronic communication documents into threaded conversations 22-1 through 22-N, where N is any positive integer. As used herein, a "conversation thread" (or simply "thread") refers to an ordered sequence of electronic communication documents, starting at a first ("root") document and proceeding to a single, final document, with each successive document in the thread corresponding to a particular user action that was taken in connection with the immediately preceding document. Thus, for example, a single conversation thread may include an initial email, a "reply-all" to the initial email (i.e., a reply to the sender and all other recipients of the initial email), a forward of the "reply-all" email, and a reply to the forwarded email. Each of threaded conversations 22-1 through 22-N may represent documents of only a single (non-branching) conversation thread, or may represent documents of a group of multiple conversation threads that all have different endpoints (final documents) but share the same root electronic communication document.

In the embodiment of FIG. 1, staging platform 16 includes a threading unit 24 to generate threaded conversations 22-1 through 22-N (or, more precisely, data indicative of the ordered arrangements/relationships within each of threaded conversations 22-1 through 22-N). This may be accomplished in various different ways, depending on the embodiment. For example, threading unit 24 may generate a "fingerprint" for each conversation segment of each electronic communication document. The fingerprint may be a hash of one or more header fields (e.g., sender and date/time) within each conversation segment, e.g., as discussed in U.S. patent application Ser. No. 15/205,980, filed on Jul. 8, 2016 and entitled "System and Method for Fingerprinting-Based Conversation Threading," and issued as U.S. Pat. No. 10,698,871 on Jun. 30, 2020, the disclosure of which is hereby incorporated herein by reference in its entirety. Threading unit 24 may compare the sets of segment fingerprints for different documents in order to identify matching segments, which may in turn enable threading unit 24 to identify which documents belong to the same thread, as well as the order/arrangement of documents within the thread.

More generally, threading unit 24 may rely on information relating to specific conversation segments within electronic communication documents, and/or information relating to specific segment portions (e.g., header locations, header field values, etc.), to generate threaded conversations 22-1 through 22-N. To provide such information, staging platform 16 may include a neural network unit 26. Neural network unit 26 may identify locations of specific conversation segments within a given electronic communication document, locations of specific segment sections (e.g., header, message body, and/or signature block) within different segments, and/or locations of specific fields (e.g., header fields) within different segments, depending on the embodiment. In embodiments where field locations are identified, neural network unit 26 may also use those locations to determine the corresponding field values. In the "fingerprint" embodiment discussed above, for example, neural network unit 26 may attempt to determine the values of a sender field and a date/time field within each conversation segment. In some embodiments, determining a field value may involve identifying the location of an individual segment, identifying a section (e.g., header) within that segment, and then identifying the appropriate field within that section. In other embodiments, the field value may be determined using a more direct approach, such as identifying a particular header field without first identifying a particular conversation segment or header.

To identify segments and/or segment portions of an electronic communication document, neural network unit 26 utilizes an artificial neural network (also referred to herein simply as a "neural network"). The neural network may be any suitable type of neural network, such as a recurrent neural network or a feedforward neural network, for example. The neural network may include a number (e.g., hundreds or thousands) of nodes or "neurons" arranged in multiple layers, with each neuron processing one or more inputs to generate a decision or other output. Some example neural networks are discussed further below in connection with FIGS. 3 and 4.

To train the neural network to identify segments, segment portions, etc., a training unit 30 of neural network unit 26 may access electronic communication documents within a test corpus 32. Test corpus 32 contains a number (e.g., tens, hundreds, thousands, etc.) of electronic communication documents with known/labeled data (i.e., "truth" data). For example, test corpus 32 may include metadata indicating known delineations between conversation segments of electronic communication documents, known delineations between segments sections (e.g., headers, message bodies, and/or signature blocks), and/or known locations of specific types of fields (e.g., the sender of the document, the recipient of the document, the date/time, etc.). The metadata may have been generated directly by a system developer, for example, or automatically generated based on labels or other indications that were added or made by a system developer, customer, or other individual (e.g., as discussed further below in connection with FIG. 7, or in another suitable manner).

Once the neural network has been trained, new document processing unit 34 may apply the trained neural network to electronic communication documents within communication corpus 12. The outputs of the neural network, indicating segment and/or segment portion locations, may then be provided to threading unit 24. Alternatively, or additionally, new document processing unit 34 may use field location information output by the neural network to determine the values of particular fields, and provide those field values to threading unit 24. Threading unit 24 may then use the data from new document processing unit 34 to arrange the electronic communication documents into threaded conversations 22-1 through 22-N as discussed above.

Once generated, threaded conversations 22-1 through 22-N may be ingested into content analysis platform 14. In some embodiments, content analysis platform 14 includes an electronic document review (EDR) interface that enables one or more reviewers to analyze the threaded conversations 22-1 through 22-N. In some embodiments, content analysis platform 14 additionally, or alternatively, includes a conceptual indexing tool that performs clustering and/or other operations on the threaded conversations 22-1 through 22-N to assist the reviewer.

Figure 2:
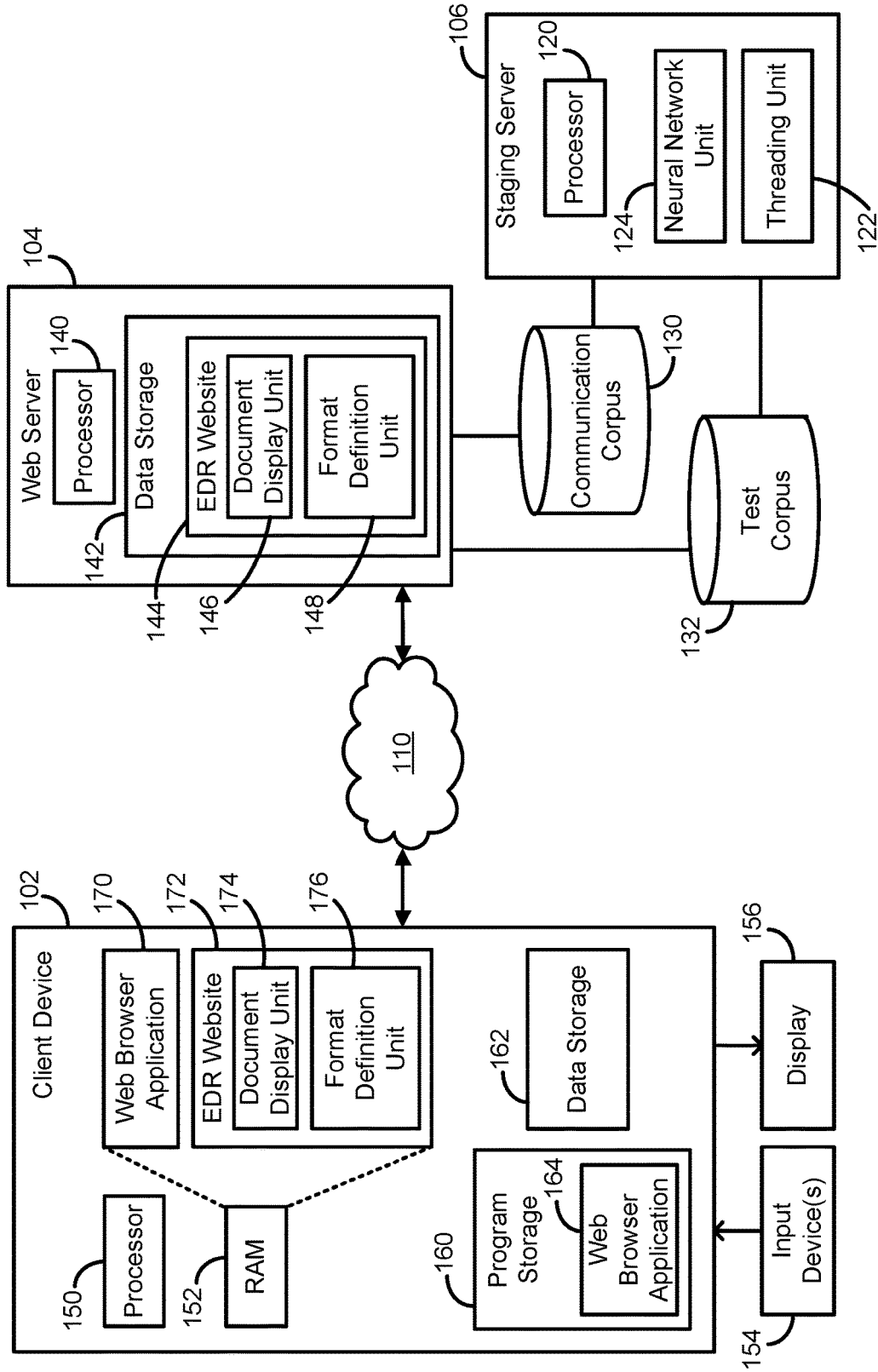
FIG. 2 depicts an example environment in which electronic communication document threads may be accurately reconstructed and presented to a user, according to one embodiment.

FIG. 2 depicts an example environment 100 that may correspond to one embodiment of the environment 10 of FIG. 1, but also includes various user/client-side components. The environment 100 includes a client device 102, a web server 104, and a staging server 106. Client device 102 is communicatively coupled to web server 104 via a network 110. Network 110 may be a single communication network, or may include multiple communication networks of one or more types (e.g., one or more wired and/or wireless local area networks (LANs), and/or one or more wired and/or wireless wide area networks (WANs) such as the Internet). Web server 104 may be remote from or co-located with staging server 106. Web server 104 and staging server 106 may each be an individual server, or may each include a group of multiple servers. Alternatively, web server 104 and staging server 106 may be combined in a single server.

Generally, web server 104 hosts web services relating to electronic document review, which may be accessed/utilized by client device 102, and staging server 106 implements certain back-end operations (e.g., conversation threading) in support of the document review services provided to client device 102. For example, staging server 106 may be used as (or within) staging platform 16 of FIG. 1, and web server 104 may be used as (or within) content analysis platform 14 of FIG. 1. While FIG. 1 shows only a single client device 102, it is understood that multiple different client devices (of different entities and/or users), each similar to client device 102, may be in remote communication with web server 104.

Staging server 16 includes a processor 120. While referred to in the singular, processor 120 may include any suitable number of processors of one or more types (e.g., one or more central processing units (CPUs), etc.). Generally, processor 120 is configured to execute software instructions stored in one or more memories (e.g., stored in a persistent memory such as a hard drive or solid state memory) of staging server 106. The software instructions, when executed by processor 120, implement a threading unit 122 and a neural network unit 124, which may correspond to threading unit 24 and neural network unit 26, respectively, of FIG. 1. In some embodiments, threading unit 122 and/or neural network unit 124 is/are part of a larger application or set of applications, which pre-processes electronic documents of all sorts for various purposes in addition to conversation threading. For example, such an application or application set may convert newly loaded electronic documents to a pdf format, assign identifiers/labels to newly loaded documents, implement textual and/or conceptual de-duplication of documents, and so on.

A communication corpus 130 and a test corpus 132 may correspond to communication corpus 12 and test corpus 32, respectively, of FIG. 1. Each of communication corpus 40 and test corpus 132 may be stored in one or more persistent memories. In some embodiments, communication corpus 130 and/or test corpus 132 is/are stored in locations distributed across a large geographic area.

In a manner similar to that discussed above in connection with FIG. 1, electronic communication documents and other data in test corpus 132 may be used by neural network unit 124 to train an artificial neural network. Thereafter, when neural network unit 124 processes documents of communication corpus 130, the resulting data (e.g., data indicating segment locations, segment section locations, field locations, and/or field values) may be passed to threading unit 122 to enable threading unit 122 to arrange documents from communication corpus 130 into conversation threads. Threading unit 122 may then generate metadata indicating the ordered relationship among documents within each thread. The metadata may be stored in communication corpus 130 in association with the appropriate documents, or in another suitable corpus or database, for example.

Web server 104 includes a processor 140. As with processor 120, processor 140 may include any suitable number of processors and/or processor types. Generally, processor 140 is configured to execute software instructions stored in one or more memories (e.g., stored in a persistent memory such as a hard drive or solid state memory) of web server 104.

Web server 104 includes a data storage 142 (e.g., one or more persistent memories) that stores one or more web pages of an electronic document review (EDR) website 144. EDR website 144 includes instructions of the web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension, and/or stand-alone software component that may be downloaded by client device 102. EDR website 144, or another application or unit of web server 104 that is not shown in FIG. 2, may also include instructions for communicating with communication corpus 130 (and possibly another corpus/database including metadata generated by threading unit 122) as needed to obtain or modify the data stored therein. In other embodiments, web server 104 accesses communication corpus 130 only indirectly, such as through staging server 106 (e.g., by sending requests for data to staging server 106) or another server.

Generally, EDR website 144 provides users accessing EDR website 144 with a browser-based user interface that enables the review of documents in communication corpus 130. To this end, EDR website 144 may include instructions of a document display unit 146 that enables a user to review the content of specific, selected documents via his or her web browser. EDR website 144 may also include instructions configured to recognize various inputs from users, and to act accordingly (e.g., to download and/or display another document in response to the user selecting the document, and/or to save user tags/designations for documents to communication corpus 130, etc.). In some embodiments, EDR website 144 also includes instructions of a format definition unit 148. Format definition unit 148 may provide a user interface via which individuals at remote client devices, such as client device 102, can provide data defining/specifying particular header formats (e.g., header formats for particular software clients and/or particular software versions). Format definition unit 148 is discussed in further detail below.

Client device 102 may be a laptop computer, a desktop computer, a tablet, a smartphone, or any other suitable type of computing device. In the embodiment of FIG. 2, client device 102 includes a processor 150, a random-access memory (RAM) 152, one or more input devices 154, a display 156, a program storage 160, and a data storage 162. As with processors 120 and 140, processor 150 may include any suitable number of processors and/or processor types. Processor 150 may include one or more CPUs and one or more graphics processing units (GPUs), for example. Generally, processor 150 is configured to execute software instructions stored in program storage 160. Program storage 160 may include one or more persistent memories (e.g., a hard drive and/or solid state memory), and stores a number of applications including a web browser application 164. Data storage 162 may also include one or more persistent memories, and generally stores data used by applications stored in program storage 160. For example, data storage 162 may store local copies of electronic communication documents that were downloaded from communication corpus 130 via web server 104.

Input device(s) 154 may include components that are integral to client device 102, and/or exterior components that are communicatively coupled to client device 102, to enable client device 102 to accept inputs from the user. For example, input device(s) 154 may include a mouse, a keyboard, a trackball device, a microphone, etc. Display 156 may also be either integral or external to client device 102, and may use any suitable display technology (e.g., LED, OLED, LCD, etc.). In some embodiments, input device(s) 154 and display 156 are integrated, such as in a touchscreen display. Generally, input device(s) 154 and display 156 combine to enable a user to interact with user interfaces provided by client device 102.

RAM 152 stores portions of the instructions and data stored by program storage 160 and data storage 162 when processor 150 executes applications stored in program storage 160. When processor 150 executes web browser application 164, for example, RAM 152 may temporarily store the instructions and data required for its execution. In FIG. 2, web browser application 164 (while being executed) is represented in the program space of RAM 152 as web browser application 170. When the user of client device 102 uses web browser application 164 to access EDR website 144, any scripts or other instructions of EDR website 144 (e.g., instructions associated with document display unit 146, and possibly format definition unit 148) may be stored as a local copy in RAM 152. FIG. 2 illustrates a scenario where EDR website 144 is stored in RAM 152 as EDR website 172, document display unit 146 is stored in RAM 152 as document display unit 174, and format definition unit 148 is stored in RAM 152 as format definition unit 176. Web browser application 170 may interpret the instructions of each of the local copies to present the page(s) of EDR website 144 to the user, and to handle user interactions with the page(s) as discussed further below. When various functions or actions are attributed herein to EDR website 172, document display unit 174, or format definition unit 176, it is understood that those actions may be viewed as being caused by web server 104, by way of providing the instructions of EDR website 144, document display unit 146, or format definition unit 148, respectively, to client device 102 via network 110.

In operation, the user of client device 102, by operating input device(s) 154 and viewing display 156, opens web browser application 164 to access EDR website 144 for purposes of reviewing (and possibly designating categories or classifications of) electronic documents. To fully access EDR website 144, the user may be required to satisfy certain security measures, such as entering a valid login and password, for example. The user may then utilize a web page of EDR website 144 to indicate the project or workspace that he or she wishes to access. Web server 104 may use the indication of the project or workspace to identify the appropriate set of documents in communication corpus 130, or to identify the entirety of communication corpus 130 (e.g., if corpus 130 only includes electronic communication documents for a single project or workspace).

By the time the user of client device 102 accesses EDR website 144, the documents in communication corpus 130 may already have been pre-processed by staging server 106. For example, threading unit 122 of staging server 106 may have previously identified which electronic communication documents belong to which threads and thread groups, and may have stored metadata indicative of those relationships (e.g., fingerprints) in communication corpus 130 or another database.

In an embodiment, when the user of client device 102 selects a specific electronic communication document (e.g., from a list of document identifiers presented by EDR website 172, and each corresponding to a document in communication corpus 130), web server 104 retrieves the electronic communication document from communication corpus 130, along with associated metadata indicating thread-related information. Web server 104 may then transmit the document and metadata to client device 102, where document display unit 174 may cause the text (and possibly images) of the selected electronic communication document to be presented to the user via a graphical user interface (GUI) on display 156. EDR website 172 may also cause thread-related information to be presented to the user on display 156. For example, web server 104 or client device 102 may use the thread-related metadata to present to the user a display indicative of the ordered relationship among documents in one or more threads (e.g., an indented list of document identifiers with the first level of indentation corresponding to a root document of a thread, and/or a visualization that graphically depicts the relationship among documents within a thread, etc.).

In some embodiments, a user can code the electronic communication documents that he or she is reviewing according to certain predefined and/or user-created tags/designations, such as "privilege," "no privilege," "responsive," "not responsive," and so on. In some embodiments, user changes to the designations for an electronic communication document are communicated to web server 104, which modifies the document designation appropriately (e.g., within communication corpus 130 or another location, depending upon where such data is stored). Web server 104 may directly modify the designation, or may request that another device or system (e.g., staging server 106) do so.

In some embodiments, the user of client device 102 (i.e., the reviewing user), or a user of another, similar client device remote from web server 104 (e.g., a client device of an administrator employed by the same entity/customer as one or more reviewing users), may provide information that facilitates the accurate pre-processing of electronic communication documents. Specifically, the user may provide information that staging server 106 can utilize to better tailor the neural network, and/or header parsing operations, to the collection of documents that a particular customer, user, or set of users expects to encounter.

To obtain this information, format definition unit 148 may generate one or more interactive controls, within EDR website 144, that enable a user to upload/submit one or more sets of header definition data to web server 104. Alternatively, format definition unit 148 may be included in a website hosted by staging server 106 (or another server not shown in FIG. 2), or may be included in software that is installed at client device 102 and configured to send information directly or indirectly to staging server 106. Each set of header definition data may define one or more characteristics of a respective header format (e.g., for headers generated by a particular software client and/or version). For example, the header definition data may specify one or more header field keywords and/or header field positions.

The header definition data may take various different forms, depending on the embodiment. For instance, the user of client device 102, or another client device, may enter a set of rules, and/or a set of regular expressions (e.g., specifying partial keywords and wildcards), that may be used to parse headers. The user of client device 102 may then activate one or more of the controls generated by format definition unit 148 (or more precisely, by the local format definition unit 176) to submit the header definition data to web server 104, which may in turn forward the header definition data to staging server 106. Staging server 106 may then parse headers using the header definition data to identify particular header fields and their values (e.g., for use by threading unit 122 to generate conversation threads).

In an alternative embodiment, format definition unit 148 (or a similar unit of a website hosted by staging server 106, or another server not shown in FIG. 2) may provide a graphical user interface (GUI) that enables individuals (e.g., reviewing users or administrators associated with customers, or system developers or administrators associated with web server 104 and/or staging server 106) to assist the operations of staging server 106. The GUI may provide an easy and convenient mechanism whereby an individual's selection of particular header fields are automatically translated into format definition data. Alternatively, the GUI may provide a mechanism whereby an individuals' selection of particular segments and/or segment portions are automatically translated into label data associated with documents that are then added to test corpus 132 and used to train the neural network. One example of such a GUI is discussed below in connection with FIG. 7.

While FIG. 2 shows an embodiment in which an electronic document review tool is provided as a web-based service, it is understood that other embodiments are also possible. For example, program storage 160 of client device 102 may store a software product that enables client device 102 to interface directly with staging server 106, without requiring web server 104, or to interface with another server (not shown in FIG. 2) that acts as an intermediary between staging server 106 and any client devices. In still another embodiment, a software product installed at client device 102 may enable client device 102 to directly implement the functions of staging server 106.

Moreover, the various components of the environment 100 may interoperate in a manner that is different than that described above, and/or the environment 100 may include additional components not shown in FIG. 2. For example, an additional platform/server may act as an interface between web server 104 and staging server 106, and may perform various operations associated with providing the threading and/or other services of staging server 106 to web server 104 and/or other web servers.

III. Example Artificial Neural Network

Figure 3:
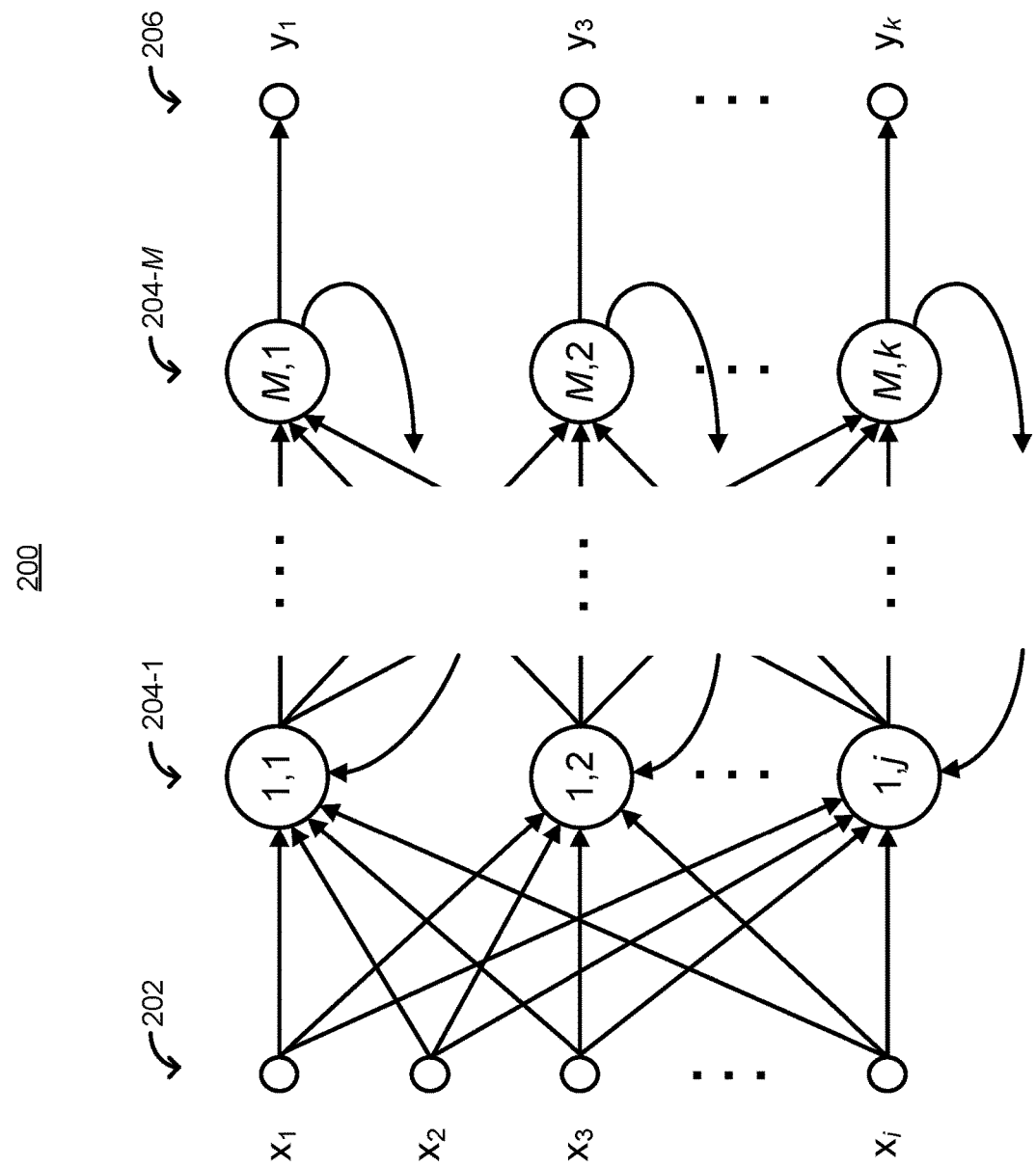
FIG. 3 depicts an example artificial neural network that may be trained by the neural network unit of FIG. 1 or the neural network unit of FIG. 2, according to one embodiment and scenario.

FIG. 3 depicts an example artificial neural network 200 that may be trained by neural network unit 26 of FIG. 1 or neural network unit 124 of FIG. 2, according to one embodiment and scenario. The example neural network 200 includes neurons arranged in multiple layers, including an input layer 202, one or more hidden layers 204-1 through 204-M, and an output layer 206. Each of the layers in neural network 200 may have any desired number of layers (e.g., j and k in FIG. 3 may be any positive integers). It is understood that the present invention may use neural networks that have different configurations and/or connections that those shown in FIG. 3, before and/or after training of the neural network.

Input layer 202 may correspond to various different characteristics of text in a given electronic communication document. For example, input layer 202 may include a first input ($x_1$) representing a total number of lines of text in the document, a second input ($x_2$) representing a position of a first line break or carriage return in the text (or a vector or array representing locations of all line breaks in the text, etc.), a third input ($x_3$) representing a position of a first colon in the text (or a vector or array representing locations of all colons in the text, etc.), and so on. Input layer 202 may include tens, hundreds, or even thousands of inputs, for example. In some embodiments, however, the number of inputs actually used by neural network 200 decreases after the training process, as discussed further below.

Each of the neurons in the hidden layer(s) 204-1 through 204-M may operate on one of more of the inputs from input layer 202, and/or one or more outputs from a previous one of the hidden layers, to generate a decision or other output. Output layer 206 may include one or more outputs each indicating the location of a particular segment or segment portion within the document being processed. In some embodiments, however, outputs of neural network 200 may be obtained not just from output layer 206, but also from one or more of hidden layer(s) 204-1 through 204-M. For example, each successive layer may examine the document under consideration at a finer level of detail. In one such embodiment where M=3, for example, hidden layer 204-1 may examine various inputs to determine delineations between multiple conversation segments in a single document, hidden layer 204-2 may examine various outputs of hidden layer 204-1 (and possibly also one or more inputs of the input layer) to determine locations of a header, message body, and/or signature block within each identified segment, and hidden layer 204-3 may examine specific segment sections identified by hidden layer 204-2 to determine locations of particular fields within those sections. In other embodiments, the functions of each layer are not as neatly delineated. For example, two or more of hidden layer(s) 204-1 through 204-M may make decisions relating to segment locations, with one of those layers also making decisions relating to specific field locations, and so on.

In some embodiments, neural network 200 is a recurrent neural network, with decisions or outputs from one or more layers of neural network 200 being fed back to one or more previous layers (e.g., the immediately preceding layer) during training, in order to provide an indication of the importance of various parameters to a particular decision or calculation. For example, training unit 30 of FIG. 1 may set weights for particular inputs of input layer 202, and/or for outputs of particular neurons in one or more of hidden layer(s) 204-1 through 204-M, based on such feedback. In addition, or alternatively, feedback of this sort may be used to identify neurons that are irrelevant, or of insignificant relevance, to the determination of the desired outputs of neural network 200. Once the training process is complete, in some embodiments, those neurons may be bypassed in order to reduce the amount of processing resources and/or processing time required for each document.

Figure 4:
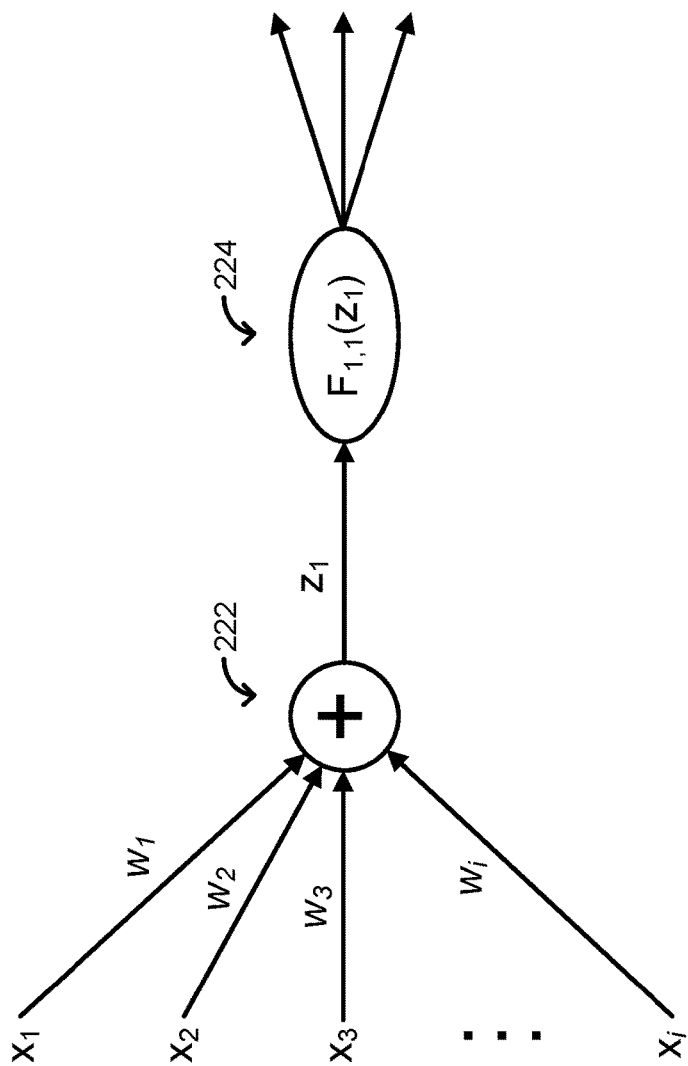
FIG. 4 depicts an example neuron that may be included in the artificial neural network of FIG. 3, according to one embodiment and scenario.

FIG. 4 depicts an example neuron 220 that may correspond to the neuron labeled as "1,1" in hidden layer 204-1 of FIG. 3, according to one embodiment and scenario. Each of the inputs to neuron 220 (in this example, each of the inputs within input layer 202 of FIG. 3) may be weighted according to a set of weights ($w_1$ through $w_i$) determined during the training process (e.g., if neural network 200 is a recurrent neural network), and then applied to a summing node 222 of neuron 220. While FIG. 4 shows all inputs $x_1$ through $x_i$, being associated with a weight, in some scenarios and/or embodiments weights are not determined for certain inputs. Moreover, certain inputs that were identified as insignificant to the accurate determination of outputs (or as being below a threshold level of significance) may be ignored by neuron 220.

The sum of the weighted inputs, $z_1$, may be input to a function 224, labeled in FIG. 4 as $F_{1,1(Z1)}$. The function 224 may represent any suitable linear or non-linear operation on $z_1$. As shown in FIG. 4, the output of function 224 may be provided to a number of neurons of the next layer, and/or may be provided as an output of neural network 200. For example, the output may indicate a location of a segment or segment portion, or may be a parameter that is calculated or determined as an interim step when determining such a location.

In other embodiments, and/or in other training scenarios, neuron 220 may be arranged differently than is shown in FIG. 4. For example, summing node 222 may be omitted, and function 224 may operate directly on one or more of the inputs $x_1$ through $x_i$. As another example, neuron 220 may not apply weights to any of the inputs $x_1$ through $x_i$.

IV. Example Processing of an Electric Communication Document

The specific manner in which the neural network employs machine vision to identify particular segments and/or segment portions may, of course, vary depending on the content and labeling of training documents within the test corpus (e.g., test corpus 32 of FIG. 1 or test corpus 132 of FIG. 2), as well as the set of document characteristics that are chosen (e.g., by a system developer and/or a customer) to serve as inputs to the neural network for purposes of training. The initial structure of the neural network (e.g., the type of neural network, the number of layers, the number of neurons per layer, etc.) typically also affects the manner in which the trained neural network processes a document. Moreover, the manner in which the trained neural network processes a document can be very complex, and/or non-intuitive. For the sake of illustration, however, some relatively simple, intuitive examples of how a trained neural network may use machine vision to process a document will now be discussed, in connection with FIG. 5.

FIG. 5 depicts text-based content of an example electronic communication document 250, which may be processed using an artificial neural network, such as neural network 200 of FIG. 3 or a different neural network generated by neural network unit 26 of FIG. 1 or neural network unit 124 of FIG. 2, for example. While electronic communication document 250 is shown in the form that it might appear to a reviewing user, the term "text-based content," as used herein, refers not only to the alphanumeric characters of electronic communication document 250, but also to any formatting or control elements used to generate the presentation shown in FIG. 5 (e.g., line spacing, line breaks, character fonts, etc.). If electronic communication document 250 represents an email, for example, the text-based content may include HTML heading elements (e.g., "<h>"), paragraph elements (e.g., "<p>"), line break elements (e.g., "<br>"), and so on. As another example, the text-based content may include ASCII printable characters as well as ASCII control characters, such as horizontal tab characters (hexadecimal value 09), carriage return characters (hexadecimal value 13), and so on.

As seen in FIG. 5, electronic communication document 250 includes four conversation segments 252A through 252D, which include respective headers 254A through 254D, message bodies 256A through 256D, and signature blocks 258A through 258D. As noted above, in some embodiments, layers of the neural network may successively examine a document at increasing levels of granularity. Thus, for example, a first layer or set of layers in the neural network may identify the locations of segments 252A through 252D. The neurons of the layer(s) may output character numbers, line numbers, and/or other indicators of the start and/or end of each of segments 252A through 252D, or may add a delineation tag to the corresponding locations within a copy of electronic communication document 250, for example. Similarly, a second layer or set of layers may identify the locations of headers 254A through 254D, and a third layer or set of layers may identify the locations of particular fields within those headers (e.g., the date/time of sending, the sender, and/or the recipient(s)). In other embodiments, locations of the message bodies 256A through 256D, the signature blocks 258A through 258D, and/or fields or portions thereof, may also, or instead, be identified by layers of the neural network. Further, different embodiments may define various sections in different ways. For example, the name "Elgar" in signature block 258C may instead be viewed as a part of message body 256C.

To identify the locations of segments 252A through 252D, the trained neural network might, for example, identify all lines that include exactly one colon and, for each such line, consider (1) the number of contiguous, immediately preceding lines that do not include a colon, (2) the number of words following the colon in the same line, (3) whether each of the words (or at least two of the words, etc.) following the colon, and in the same line as the colon, has the first letter capitalized, and so on. For instance, lines that include exactly one colon, are immediately preceded by at least three lines with no colons, and have exactly two to four words after the colon in the same line (with at least two of the words having only the first letter capitalized) may each be viewed as the first line of a new segment.

The neural network might also follow parallel paths for identifying segments, particularly if the neural network was trained using documents generated by different software clients (and/or different versions of a software client, and/or documents with field names in different languages). For example, the neural network might also identify all instances of at least two contiguous blank lines, and examine various characteristics of the text immediately preceding and/or following those blank lines.

To identify the locations of headers 254A through 254D within segments 252A through 252D, the trained neural network might assume that each segment begins with a header, and identify the end of each header using various pieces of information within the text-based content. For example, the neural network may identify the end of the header as the first blank line, within a given segment, occurring after the first line of that segment.

To identify the locations of particular fields within headers 254A through 254D, the trained neural network might identify instances in which one or two words at the beginning of a line in a given header are immediately followed by a colon, and then search for particular keywords (e.g., "From," "Sender," or "Author" for a sender of the message corresponding to that segment) within the word or words preceding the colon in those lines. In some embodiments, the neural network has access to a library of potential keywords, which may or may not have been generated or modified during the training process, depending on the embodiment. In some embodiments and scenarios, different libraries are available, with each library including keywords in a different language (e.g., English, Spanish, French, German, Russian, etc.). In some embodiments and/or scenarios, the neural network uses a priority of languages to attempt to identify keywords in a particular order (e.g., first using English, then Spanish if that is unsuccessful, etc.), thereby saving processing resources in instances where certain language are more likely to be encountered than others. The language priority may be indicated by a system developer or by a customer via a user interface (e.g., as discussed further below), or may be automatically determined during training of the neural network, for example.

In some embodiments, the neural network also, or instead, generates indicators of the likelihood or confidence that the location of a particular segment or segment portion is correct. For example, some or all of the location indicators generated for electronic communication document 250 may be associated with a confidence score between 1 and 100. In some embodiments, the confidence scores may be used by a threading unit (e.g., threading unit 24 of FIG. 1 or threading unit 122 of FIG. 2) to calculate a likelihood or confidence that electronic communication document 250 belongs to a particular thread. Electronic communication document 250 may be added to the thread only if the likelihood or confidence exceeds some threshold level, for example.

Alternatively, or in addition, the likelihood or confidence level that electronic communication document 250 belongs to a particular thread, and/or is at a particular position within the thread, may be displayed to a reviewing user (e.g., via EDR website 172 of FIG. 2). This may help to avoid user confusion in certain situations, such as when a user encounters an electronic communication document with a message body that does not make sense in the context of a particular thread. Further, this approach may avoid the common misconception among users that threading is an exact science, or that thread information presented to a user is necessarily complete and error-free.

In some embodiments, the threading unit can consider whether to add electronic communication document 250 to a particular thread even if the neural network has not successfully generated all of its outputs. For example, the neural network may successfully identify segments 252A through 252D, as well as the sender, recipient, and date/time fields of headers 254A, 254B, and 254D, but fail to identify all of the corresponding fields in header 254C due to the different format of that header. Nonetheless, the threading unit may be able use the incomplete output of the neural network to add electronic communication document 250 to a particular thread. This may provide an important advantage over conventional techniques, which typically discard or ignore documents that cannot be fully parsed.

Figure 6:
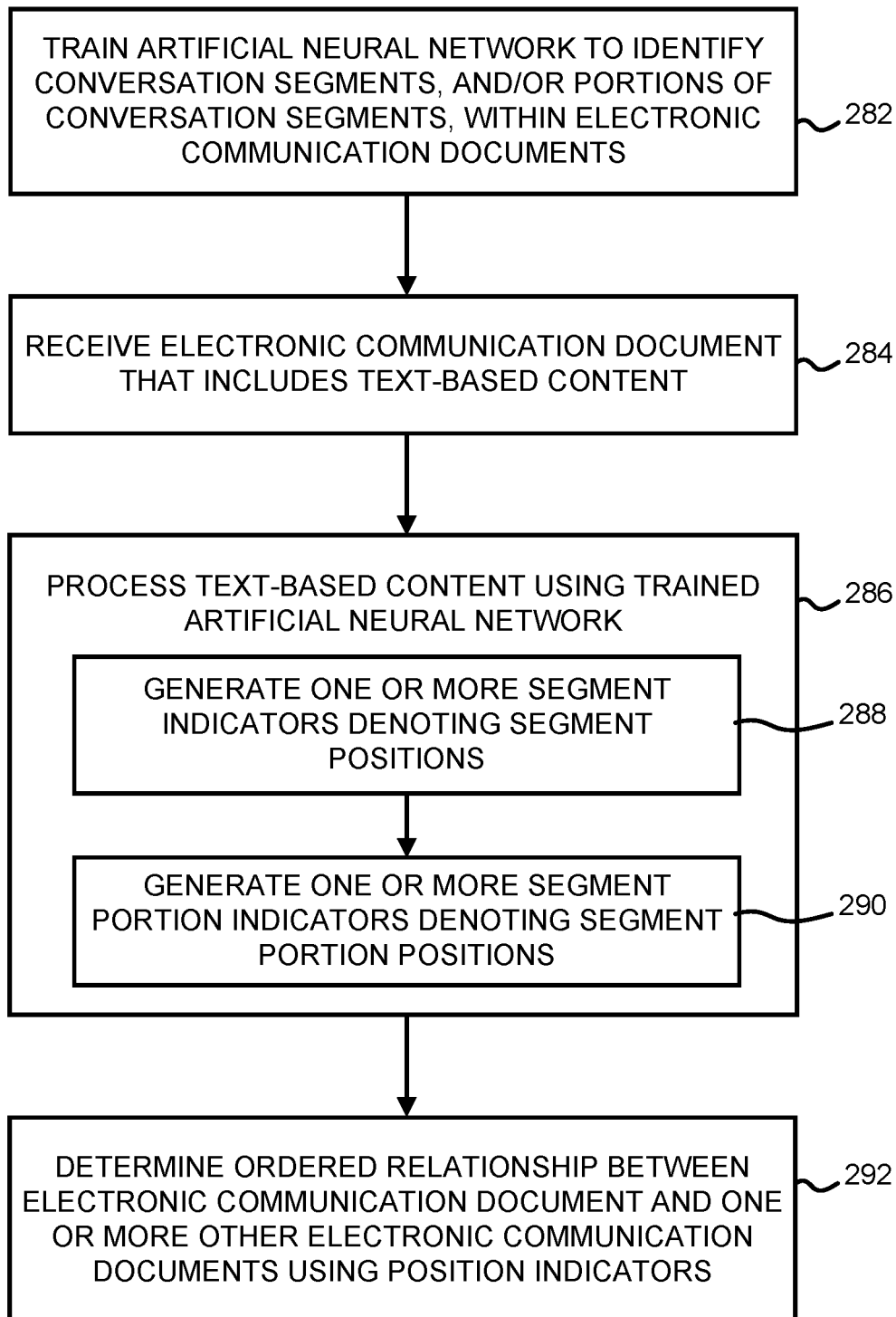
FIG. 6 is a flow diagram of an example method for identifying portions of electronic communication documents, according to one embodiment.

V. Example Method for Identifying Portions of Electronic Communication Documents FIG. 6 is a flow diagram of an example method 280 for identifying portions of electronic communication documents. The method 280 may be implemented by one or more processors of a computing device or system, such as processor 120 of staging server 106 in FIG. 2, for example. In the method 280, an artificial neural network is trained (block 282) to identify conversation segments, and/or portions of conversation segments, within electronic communication documents (e.g., emails). The segment "portions" may include specific types of segment sections (e.g., header, message body, and/or signature block), and/or may include specific types of fields within segments (e.g., specific header fields). The neural network may be trained by analyzing a test set of electronic communication documents that have each previously been labeled or tagged to indicate positions of segments and/or segment portions. For example, block 282 may include comparing one or more interim position indicators that were generated by the neural network (when analyzing a first document in the test set) to one or more known position indicators corresponding to that first document.

The neural network (e.g., a neural network similar to neural network 200 of FIG. 3) may include multiple layers, including an input layer with a number of different input parameters that each correspond to a different characteristic of text-based content. The "text-based content" may include both alphanumeric characters that can be viewed by a person reading a given document, and formatting or control elements that specify the presentation (e.g., line spacing, line breaks, font, etc.) of the alphanumeric characters. The characteristics that correspond to the input parameters may be of any sort that could potentially be useful for discerning the location of segments and/or particular segment portions. For example, there may be hundreds of characteristics, such as characteristics indicative of line break positioning, characteristics indicative of line spacing, characteristics indicative of character types (e.g., font, font size, etc.), characteristics indicative of character counts (e.g., per line), characteristics indicative of colon positioning, and/or any number of other suitable characteristics.

The neural network may be a recurrent neural network. Moreover, the training performed at block 282 may include determining weights that the neural network will apply to one or more of the input parameters, and/or to one or more outputs generated by neurons of one or more of the neural network layers.

An electronic communication document (e.g., another email) that includes text-based content is then received (block 284). The electronic communication document may or may not be of the same type (e.g., generated by the same software client and version) as one or more of the training documents used at block 282. The electronic communication document may be retrieved from a local or remote database (e.g., communication corpus 12 of FIG. 1 or communication corpus 130 of FIG. 2), or may be pushed to a server implementing the method 280 by another server, for example.

The text-based content of the document received at block 284 is then processed (block 286) using the trained neural network. The processing may include generating, within the layers of the neural network, one or more position indicators for the electronic communication document. In particular, the processing may include generating one or more segment indicators denoting positions of one or more conversation segments within the electronic communication document (block 288), and/or generating one or more segment portion indicators denoting positions of one or more portions of one or more conversation segments within the electronic communication document (block 290). Segment "portion" indicators may include indicators of the locations of particular segment sections (e.g., headers, and/or message bodies, etc.), and/or indicators of the locations of particular fields (e.g., particular header fields).

In some embodiments, successive layers of the neural network process the document at increased levels of granularity. For example, a first layer of the neural network may generate one or more segment indicators denoting positions of different segments, a second layer of the neural network may generate one or more segment section indicators denoting positions of different segment sections (e.g., headers, message bodies, and/or signature blocks), and a third layer of the neural network may generate one or more field indicators denoting positions of different fields (e.g., different header fields).

An ordered relationship between the electronic communication document and one or more other electronic communication documents is determined (block 292) using the position indicators (i.e., the segment and/or segment portion position indicators) that were generated at block 286. The ordered relationship may be determined as a part of a conversation threading process implemented by a threading unit (e.g., threading unit 24 of FIG. 1 or threading unit 122 of FIG. 2). For example, the position indicator(s) generated at block 286 may include indicators for the positions of particular header fields (e.g., sender, recipient, and/or date/time) within each of one or more conversation segments of the document, and block 292 may include determining values of those fields as well as hashing those values. Block 292 may also include generating and storing metadata indicative of the ordered relationship.

Figure 7:
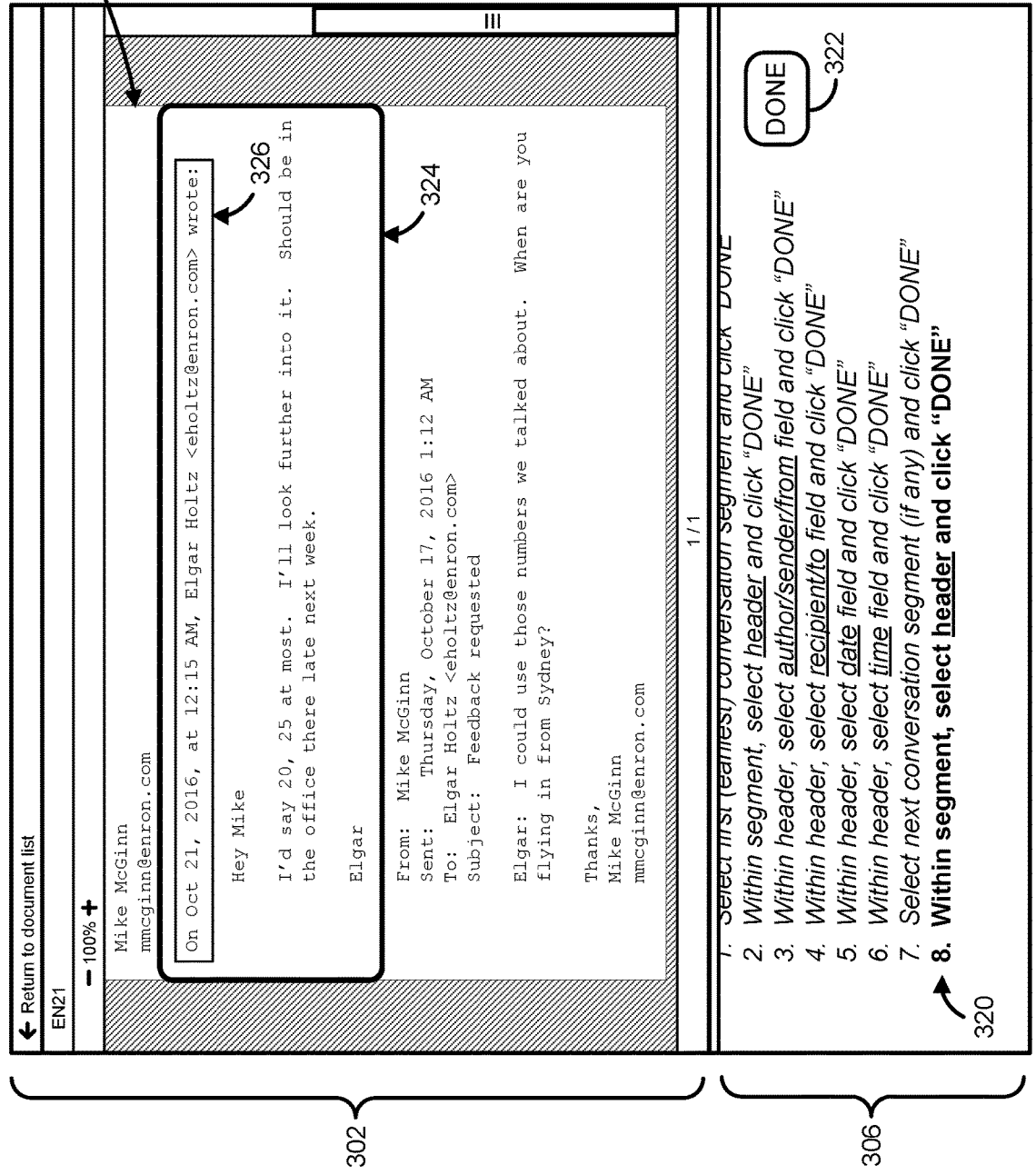
FIG. 7 depicts an example user interface that may be used to automatically generate header definition data, according to one embodiment and scenario.

VI. Example Graphical User Interface for Facilitating Identification of Portions of Electronic Communication Documents As noted above in connection with FIG. 2, a GUI may be provided to enable individuals to assist the operations of staging server 106. One such GUI 300, corresponding to one embodiment and scenario, is depicted in FIG. 7. In one embodiment, GUI 300 is presented on display 156 of FIG. 2 via web browser application 170 and format definition unit 176 of EDR website 172. In other embodiments, GUI 300 is provided by a different website (e.g., a website that can only be accessed by an administrator of a customer, etc.) or software application. Moreover, in some embodiments, GUI 300 may also, or instead, by presented on a display of a client device associated with an entity that owns and/or maintains staging server 106 (e.g., to enable a software developer, technical sales representative, etc., to perform the user operations described below). For ease of explanation, however, the description of FIG. 7 that follows assumes that GUI 300 is generated by EDR website 172.

In the example GUI 300, a document review pane 302 shows the text of an electronic communication document 304 (e.g., an email). Document review pane 302 may be generated by document display unit 174 of FIG. 2, for example, and format definition unit 176 may communicate with document display unit 174 to enable some or all of the user interactions described below. Alternatively, document review pane 302 may be generated directly by format definition unit 176.

GUI 300 also includes a user prompt pane 306 that guides a user through a process for tagging/labeling specific conversation segments and/or segment portions within electronic communication document 304. In particular, user prompt pane 306 presents to the user a prompt 320 indicating which action the user should take next with respect to electronic communication document 304. The prompt 320 may generally instruct the user to select or tag a particular portion of electronic communication document 304. The user may select or tag that portion, within document review pane 302, by left-clicking and dragging a mouse, for example, or using touch inputs or any other suitable method of selection.

After selecting a portion of electronic communication document 304 as instructed, the user may select an interactive control 322 within user prompt pane 306 to confirm the selection. A new prompt similar to prompt 320 may then appear or, if all relevant sections have been tagged, the prompting process may end. In alternative embodiments, interactive control 322 is in another location (e.g., in document review pane 302, or in a right-click menu item, etc.), or is not included in GUI 300 at all (e.g., if the selection requires no user confirmation).

In the example embodiment of FIG. 7, the user is prompted to select conversation segments (in chronological order from newest to oldest) and, for each segment, to select the header, the author/sender/from field, the recipient/to field, the data field, and the time field. In other embodiments, other segment sections and/or fields may be selected, older segments may be tagged before newer segments, the date and time may instead be considered a single field, and so on.

In some embodiments, document review pane 304 displays an indicator of the current user selection, and/or of some or all of the previous user selections. In the example GUI 300, for instance, indicators corresponding to selections of and within a current conversation segment persist until a new conversation segment is chosen. Thus, it is seen in FIG. 7 that a past user selection of a second conversation segment (corresponding to the seventh prompt) is indicated by an indicator 324, and a current user selection of a header within that segment (corresponding to the eight, current prompt) is indicated by an indicator 326. In other embodiments, indicators may have a different appearance, may appear at different times, or may be omitted entirely (e.g., other than highlighting or some other brief indicator during the selection operation, to let the user know what he or she has just selected).

In the embodiment of FIG. 7, each prompt persists in user prompt pane 306 even after the user has taken the corresponding action. In other embodiments, a prompt does not persist after the user has selected a portion of electronic communication document 304 and activated interactive control 322. Moreover, in some embodiments, user prompt pane 306 may be omitted and prompt 320 may instead be shown in document review pane 302.

In embodiments that utilize neural networks (e.g., the embodiment of FIGS. 1 and/or 2), the user selections made in response to the series of prompts may trigger the automatic generation of metadata that labels or tags the corresponding portions of electronic communication document 304. For example, format definition unit 176 of FIG. 2 may detect the user selections, and in response automatically generate metadata specifying which portions of electronic communication document 304 correspond to which segments/headers/fields. Formation definition unit 176 may then transmit the metadata, along with electronic communication document 304, to web server 104, which may in turn store (or cause staging server 106 to store) the metadata and electronic communication document 304 in test corpus 132 for use in training the neural network (e.g., for use during the initial training of the neural network, or in a subsequent training/refining stage). In some embodiments and scenarios, electronic communication documents and metadata received via format definition unit 176 are more heavily weighted during the training, under the assumption that those documents are most representative of the specific set of documents that will be processed/threaded.

In some embodiments that parse headers (instead of, or in addition to, using a neural network), the user selections made in response to the series of prompts cause format definition unit 176 to automatically generate a set of parsing rules. The rules may be generated based on the keywords of fields selected by the user, for example, and/or based on the relative positions of selected header fields, for example. Formation definition unit 176 may then transmit the rules to web server 104, which may in turn forward the rules to staging server 106 for use in header parsing (e.g., for purposes of threading electronic conversation documents in communication corpus 130).

In some embodiments, GUI 300 (or another interface or mechanism) also enables a user to indicate a priority of languages. For example, a customer may know that most documents for a particular project will be in English, that a large minority of the documents will be in French, and a smaller minority of the documents will be in Russian, German, or Spanish. The user may indicate the expected order using one or more interactive controls (e.g., a series of boxes for typing in languages, or a menu enabling the ordered selection of multiple languages, etc.). The controls may be provided to the user within user prompt pane 306, for example.

Format definition unit 176 may detect the user-indicated order of languages, and transmit the order to web server 104, and web server 104 may forward the indicated order to staging server 106. Staging server 106 may then parse headers for keywords according to the different languages, starting with the most likely/common language and proceeding until an expected keyword or set of keywords is found (e.g., one keyword per conversation segment identified in a given document, etc.). By avoiding the need to parse the headers of each document according to all possible languages, less time (and/or fewer processing resources in staging server 106) may be required for the threading process.

Figure 8:
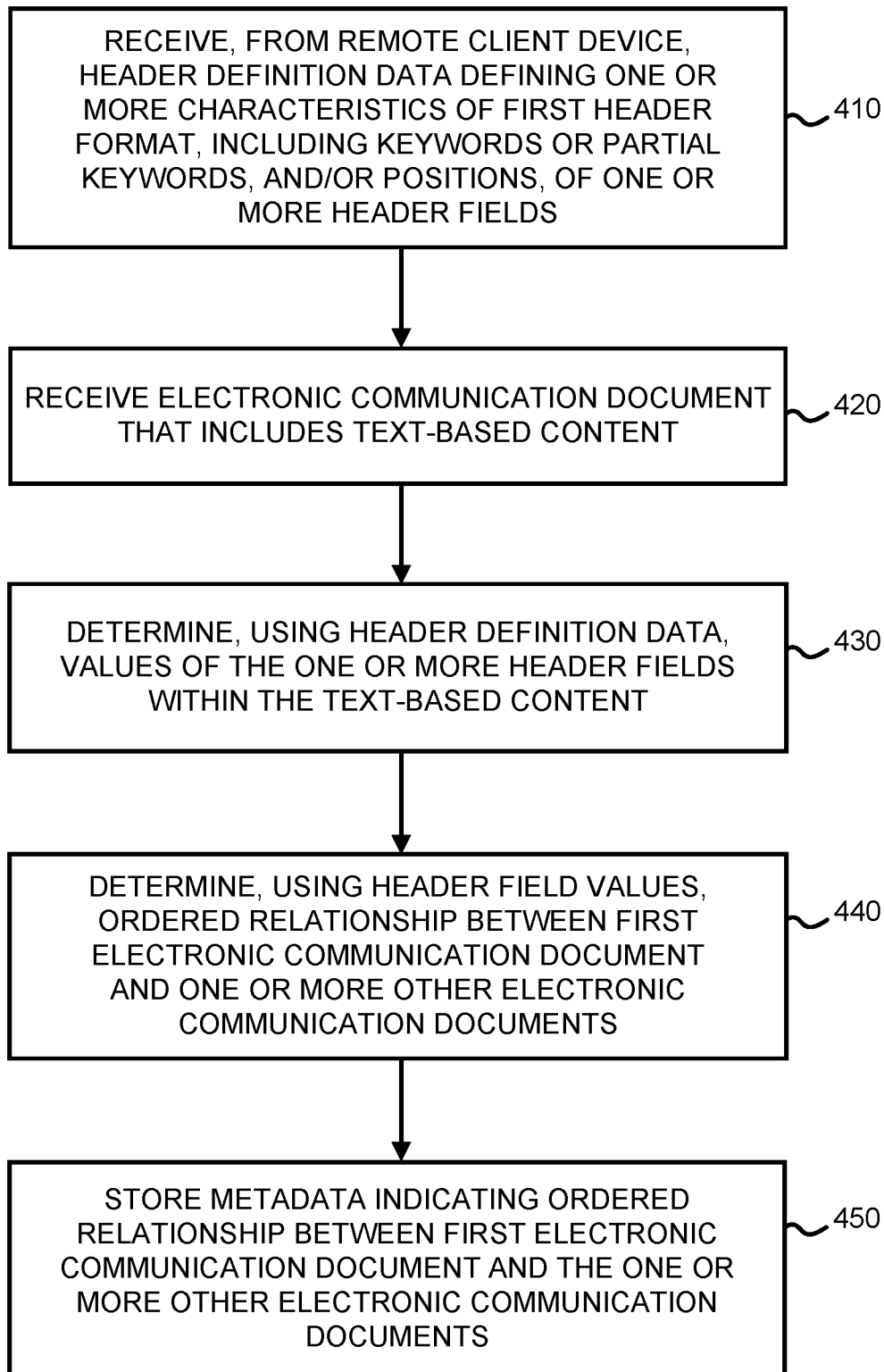
FIG. 8 is a flow diagram of an example method for facilitating recognition of header fields in electronic communication documents, according to one embodiment.

VII. Example Method for Facilitating Recognition of Header Fields in Electronic Communication Documents FIG. 8 is a flow diagram of an example method 400 for facilitating the recognition of header fields in electronic communication documents (e.g., for a threading process). The method 400 may be implemented by one or more processors of a computing device or system, such as processor 120 of staging server 106 of FIG. 2, for example. In the method 400, header definition data is received (block 410) from a remote client device. The header definition data defines one or more characteristics of a particular header format. For example, the header definition data may define one or more header field keywords (e.g., header field labels/names) and/or partial keywords (e.g., partial header field labels/names with wildcards), and/or positions of one or more header field keywords. The header field or fields may include a sender field (e.g., "Author," or "From," etc.), a recipient field (e.g., "Recipient," or "To," etc.), a date field, and/or a time field (e.g., a "Sent" field indicating both date and time), for example.

In some embodiments, the header definition data is received directly from the remote client device (e.g., from client device 102 via network 110 of FIG. 2). Alternatively, the header definition data may be received via one or more other computing devices or systems, such as web server 104 of FIG. 2. The header definition data may include a set of one or more rules, and/or may include one or more regular expressions (e.g., including one or more partial keywords and wildcards), that define the characteristic(s) of the header format.

An electronic communication document (e.g., an email) that includes text-based content is received (block 420). The electronic communication document may be retrieved from a local or remote database (e.g., communication corpus 12 of FIG. 1 or communication corpus 130 of FIG. 2), or may be pushed to a server implementing the method 400 by another server, for example. The "text-based content" may include both alphanumeric characters that can be viewed by a person reading a given document, and formatting or control elements that specify the presentation (e.g., line spacing, line breaks, font, etc.) of the alphanumeric characters.

Using the header definition data received at block 410, values of the one or more header fields (for which keywords and/or partial keywords are defined by the header definition data) within the text-based content are determined (block 430). If the header definition data includes whole or partial keywords, for example, those keywords or partial keywords may be used to search for the appropriate field values. As another example, if the header definition data includes language priority data, the header keywords for each language may be used, in priority order, one at a time until an expected number of keywords are found (e.g., one per segment, or three per segment, etc.).

Using the header field value(s) determined at block 430, an ordered relationship between the electronic communication document (received at block 420) and one or more other electronic communication documents is determined (block 440). The ordered relationship may be determined as a part of a conversation threading process implemented by a threading unit (e.g., threading unit 24 of FIG. 1 or threading unit 122 of FIG. 2). For example, block 440 may include hashing the header field value(s) determined at block 430.

Metadata indicating the ordered relationship, which may be generated during block 440, is stored in a memory (block 450). For example, the metadata may be stored in communication corpus 130 of FIG. 1, in association with a copy of the electronic communication document that was received at block 420.

In some embodiments, the method 400 may also include one or more additional blocks, and/or certain blocks may be omitted. For example, the method 400 may include an additional block in which a user interface (e.g., GUI 300 of FIG. 7) is caused to be provided to a user at the remote client device. In such an embodiment, the header definition data received at block 410 may include data that was generated based on user inputs entered via the user interface. As another example, block 450 may be omitted from the method 400. As yet another example, the method 400 may include an additional block in which an electronic document review tool is caused to present (e.g., to a user of the remote client device) an indication of the ordered relationship determined at block 440.

VIII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying particular portions of electronic communication documents through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for facilitating recognition of header fields in electronic communication documents, the computer-implemented method comprising:
  receiving, at a computing system, header definition data defining one or more characteristics of a first header format, wherein the one or more characteristics include one or both of (i) keywords or partial keywords, and (ii) positions, corresponding to one or more header fields;
  receiving, by one or more processors of the computing system, a first electronic communication document that includes text-based content, the text-based content including a plurality of conversation segments, and the plurality of conversation segments including one or more headers;
  determining, by the one or more processors and using the header definition data, values of the one or more header fields within the one or more headers of at least one of the plurality of conversation segments;
  determining, by the one or more processors and using the determined values of the one or more header fields, an ordered relationship between the first electronic communication document and one or more other electronic communication documents; and
  storing, by the one or more processors, metadata indicating the ordered relationship between the first electronic communication document and the one or more other electronic communication documents to facilitate user review of at least the first electronic communication document and the one or more other electronic communication documents via an electronic document review tool.

2. The computer-implemented method of claim 1, further comprising:
  causing a user interface to be provided to a user at a remote client device,
  wherein receiving header definition data includes receiving header definition data that was generated based on user inputs entered via the user interface.

3. The computer-implemented method of claim 2, wherein causing a user interface to be provided to a user at the remote client device includes causing the electronic document review tool to present the user interface to the user.

4. The computer-implemented method of claim 3, wherein causing the electronic document review tool to present the user interface to the user includes causing the electronic document review tool to present a user interface configured to:
  display a test electronic communication document to the user;
  display prompts to the user, the prompts indicating which portions of the test electronic communication document should be tagged by the user; and detect user inputs corresponding to user tags of various portions of the test electronic communication document made in response to the prompts.

5. The computer-implemented method of claim 1, wherein receiving header definition data includes receiving one or more rules that define the one or more characteristics.

6. The computer-implemented method of claim 1, wherein receiving header definition data includes receiving one or more regular expressions that define the one or more characteristics, and wherein the one or more characteristics include one or more header field partial keywords.

7. The computer-implemented method of claim 1, wherein the one or more characteristics include one or both of (i) keywords or partial keywords, and (ii) positions, corresponding to one or more of the following header fields:
a field indicating a sender of a given electronic communication document;
a field indicating a recipient of the given electronic communication document;
a field indicating a date on which the given electronic communication document was sent; or
a field indicating a time at which the given electronic communication document was sent.

8. The computer-implemented method of claim 1, wherein receiving header definition data includes:
receiving language priority data indicating an order in which each of a plurality of languages is to be considered when attempting to determine header field values for a given electronic communication document.

9. The computer-implemented method of claim 1, further comprising:
causing an electronic document review tool to present, to a user of a remote client device, an indication of the ordered relationship between the first electronic communication document and the one or more other electronic communication documents.

10. A computing system comprising:
an electronic document database;
one or more processors; and
one or more memories storing instructions that, when executed by the one or more processors, cause the computing system to
receive header definition data defining one or more characteristics of a first header format, wherein the one or more characteristics include one or both of (i) keywords or partial keywords, and (ii) positions, corresponding to one or more header fields,
retrieve, from the electronic document database, a first electronic communication document that includes text-based content, the text-based content including a plurality of conversation segments, and the plurality of conversation segments including one or more headers,
determine, using the header definition data, values of the one or more header fields within the one or more headers of at least one of the plurality of conversation segments,
determine, using the determined values of the one or more header fields, an ordered relationship between the first electronic communication document and one or more other electronic communication documents, and
store metadata indicating the ordered relationship between the first electronic communication document and the one or more other electronic communication documents to facilitate user review of at least the first electronic communication document and the one or more other electronic communication documents via an electronic document review tool.

11. The computing system of claim 10, wherein:
the instructions further cause the computing system to cause the electronic document review tool present a user interface to a user at a remote client device; and
the header definition data includes data that was generated based on user inputs entered via the user interface.

12. The computing system of claim 11, wherein the instructions cause the computing system to cause the electronic document review tool to present the user interface to the user at least by causing the electronic document review tool to present a user interface configured to:
display a test electronic communication document to the user;
display prompts to the user, the prompts indicating which portions of the test electronic communication document should be tagged by the user; and
detect user inputs corresponding to user tags of various portions of the test electronic communication document made in response to the prompts.

13. The computing system of claim 10, wherein the header definition data includes one or both of (i) one or more rules that define the one or more characteristics, and (ii) one or more regular expressions that define the one or more characteristics.

14. The computing system of claim 10, wherein the one or more characteristics include one or both of (i) keywords or partial keywords, and (ii) positions, corresponding to one or more of the following header fields:
a field indicating a sender of a given electronic communication document;
a field indicating a recipient of the given electronic communication document;
a field indicating a date on which the given electronic communication document was sent; or
a field indicating a time at which the given electronic communication document was sent.

15. The computing system of claim 10, wherein the header definition data includes language priority data indicating an order in which each of a plurality of languages is to be considered when attempting to determine header field values for a given electronic communication document.

16. A non-transitory, computer-readable medium storing instructions that, when executed by one or more processors, cause the one or more processors to:
receive header definition data defining one or more characteristics of a first header format, wherein the one or more characteristics include one or both of (i) keywords or partial keywords, and (ii) positions, corresponding to one or more header fields;
receive a first electronic communication document that includes text-based content, the text-based content including a plurality of conversation segments, and the plurality of conversation segments including one or more headers;
determine, using the header definition data, values of the one or more header fields within the one or more headers of at least one of the plurality of conversation segments;
determine, using the determined values of the one or more header fields, an ordered relationship between the first electronic communication document and one or more other electronic communication documents; and
store metadata indicating the ordered relationship between the first electronic communication document and the one or more other electronic communication documents to facilitate user review of at least the first electronic communication document and the one or more other electronic communication documents via an electronic document review tool.

17. The non-transitory, computer-readable medium of claim 16, wherein:
the instructions further cause the one or more processors to cause the electronic document review tool present a user interface to a user at a remote client device; and
the header definition data includes data that was generated based on user inputs entered via the user interface.

18. The non-transitory, computer-readable medium of claim 17, wherein the instructions cause the one or more processors to cause the electronic document review tool to present the user interface to the user at least by causing the electronic document review tool to present a user interface configured to:
display a test electronic communication document to the user;
display prompts to the user, the prompts indicating which portions of the test electronic communication document should be tagged by the user; and
detect user inputs corresponding to user tags of various portions of the test electronic communication document made in response to the prompts.

19. The non-transitory, computer-readable medium of claim 16, wherein the one or more characteristics include one or both of (i) keywords or partial keywords, and (ii) positions, corresponding to one or more of the following header fields:
a field indicating a sender of a given electronic communication document;
a field indicating a recipient of the given electronic communication document;
a field indicating a date on which the given electronic communication document was sent; or
a field indicating a time at which the given electronic communication document was sent.

20. The non-transitory, computer-readable medium of claim 16, wherein the header definition data includes language priority data indicating an order in which each of a plurality of languages is to be considered when attempting to determine header field values for a given electronic communication document.

* * * * *